United States Patent Office 3,423,320
Patented Jan. 21, 1969

3,423,320
PREPARATION OF FERROMAGNETIC
CHROMIUM DIOXIDE
Joseph H. Balthis, Jr., Mendenhall, Pa., assignor to E. I. du Pont de Nemours and Company, Wilmington, Del., a corporation of Delaware
No Drawing. Filed Dec. 14, 1965, Ser. No. 513,841
U.S. Cl. 252—62.51      5 Claims
Int. Cl. C04b 35/12; H01f 1/00

This invention relates to, and has as its principal object provision of, a novel process for the preparation of ferromagnetic chromium dioxide. The invention also provides a new process for making alkali metal chromium oxides containing the $Cr_3O_8$ grouping.

Magnetic materials, particularly those having high saturation magnetization, are extensively used in a number of applications, including magnetic recording, coil cores, and permanent magnets. Chromium dioxide is a material having high saturation magnetization and a number of processes for its preparation in finely divided form have been described. These employ chromium oxides, such as $CrO_3$, and $Cr_2O_3$, as starting materials. Chromium dioxide in massive form has been prepared by thermal decomposition of chromyl chloride.

The present invention provides a novel process for the preparation of ferromagnetic chromium dioxide having desirable magnetic properties, including high saturation magnetization. This process comprises heating at least one alkali metal chromium oxide of the formula $MCr_3O_8$, where M is an alkali metal, i.e., Li, Na, K, Rb, or Cs, with water in an amount of at least 10% (by weight) based on $MCr_3O_8$, at 325–500° C. under a pressure of at least 250 atmospheres, and separating the chromium dioxide formed. The invention also includes a novel process for preparing $MCr_3O_8$ in high yield and in particularly useful, finely divided form by reaction of a mixture of $CrO_3$, $Cr_2O_3$, and an alkali metal dichromate at 170–400° C. under a pressure of up to 1000 atmospheres.

The temperature and pressure at which conversion of $MCr_3O_8$ to ferromagnetic chromium oxide is carried out in accordance with the present invention are interrelated, and, in general, the higher the temperature within the operable range, the higher the pressure required. Although pressures of 3000 atmospheres or more can be employed, lower pressures are preferred since they permit the us of simpler equipment. The pressure will usually be in the range of 500–1000 atmospheres. When such pressures are employed, the reaction temperature is preferably in the range of 350–450° C.

The reaction of $MCr_3O_8$ and water is believed to result in the formation of $CrO_2$, $M_2Cr_2O_7$, and oxygen. The dichromate formed as a by-product can be recovered from the wash water and reused in the synthesis of $MCr_3O_8$.

Reaction conditions for synthesis of $CrO_2$ from $MCr_3O_8$ and water are usually maintained for a period of 1–24 hours or longer. In many cases, a reaction time of about 6 hours has been found convenient.

Various modifying agents can be used in the preparation of $CrO_2$ according to this invention. Examples of suitable agents are shown in U.S. Patents 2,885,365, 2,923,683, 2,923,684, 2,923,685, 3,034,988 and 3,068,176. Of these, antimony and iron are preferred. Tellurium can also be employed. The proportion of modifier employed is as described in the above-mentioned patents and ranges from 0.008% (by weight, based on $MCr_3O_8$) in the case of ruthenium to 25% in the case of antimony. Usually the proportion of modifier will be below 14% and preferably below 5%. If desired, the modifying agents can be incorporated during preparation of $MCr_3O_8$. It will be understood that compounds of the above-named elements as well as the elements themselves can be added as modifiers. Tellurium, for example, is preferably introduced in the form of the oxide $TeO_2$ or telluric acid, $H_6TeO_6$.

Materials, such as $CrO_3/Cr_2O_3$, $CrO_3$, $Cr_2O_5$, $Cr_5O_{12}$, and $Cr_3O_8$, that normally give $CrO_2$ under the conditions specified for this invention can be added to the $$MCr_3O_8/H_2O$$

reaction mixture as desired, thereby increasing the yield of $CrO_2$.

The process of this invention can be carried out in any equipment, capable of providing the desired temperature and pressure conditions, which is resistant to attack by the reaction mixture. Suitable reaction vessels can be of stainless steel, titanium or platinum. In one convenient method the mixture containing $MCr_3O_8$ and water is placed in a flexible platinum tube which is then hermetically sealed and subjected to the conditions of temperature and pressure which have been described. At the end of the desired reaction time, the sealed tube is cooled and opened, the contents removed, and the ferromagnetic chromium dioxide isolated by washing with water. The product is a dark gray to black, strongly magnetic chromium dioxide of tetragonal crystal structure in the form of small particles. Depending on the particle size of $MCr_3O_8$ used as a starting material and the reaction conditions, the $CrO_2$ particles produced may range up to about 100 microns in length and up to about 10 microns in width. The axial ratio, i.e., the ratio of length to width, may be as high as 10:1 to 100:1 or higher. The particles have high saturation magnetization and, depending on size and acicularity, may have an intrinsic coercive force from considerably below to considerably above 100 oersteds. A preferred method of achieving high coercivity involves using finely divided $MCr_3O_8$, prepared, for example, by reaction of $CrO_3$, $Cr_2O_3$ and $M_2Cr_2O_7$ as described later. The particles of $CrO_2$ are believed to be single crystals and many consist of single magnetic domains.

Magnetic properties which are particularly important and which render these products useful in a variety of applications are the intrinsic coercive force ($H_{ci}$), saturation per gram or sigma value ($\sigma_s$), and the remanence ratio ($\sigma_r/\sigma_s$), i.e., the ratio of the retentivity or remanence per gram to the saturation per gram. Retentivity and saturation are defined on pages 5–8 of Bozorth's "Ferromagnetism," D. Van Nostrand Company, New York, 1951. The sigma values given herein are determined in a 4400 gauss field on apparatus similar to that described by T. R. Bardell on pages 226–228 of "Magnetic Materials in the Electrical Industry," Philosophical Library, New York, 1955. The definition of intrinsic coercive force ($H_{ci}$) is given in Special Technical Publication No. 85 of the American Society for Testing Materials entitled "Symposium on Magnetic Testing," 1948, pp. 191–198. The values for intrinsic coercive force given herein are determined in a DC ballistic-type apparatus which is a modified form of the apparatus described by Davis and Hartenheim in the Review of Scientific Instruments 7, 147 (1936).

The process of this invention is illustrated by the following examples in which quantities are expressed in parts by weight, except as otherwise noted. Example 6 represents a preferred embodiment of the process of the invention for producing chromium dioxide.

EXAMPLE 1

$KCr_3O_8$ (6 g.) and water (1 cc.) in a flexible-walled sealed platinum tube were placed in a pressure vessel and pressured to 2600 atmospheres. The tube and contents were then heated during one hour to 220° C. and further to 450° C. at a rate of 16° C./hour. A temperature of 450° C. and a pressure of 3000 atmospheres were maintained for a period of 24 hours whereupon the pressure vessel was cooled, the pressure released and the platinum tube removed and opened. The product was a gray-black solid which was thoroughly washed with water, leaving ferromagnetic chromium dioxide in the form of small particles ranging in length from 4.8–24 microns and in width from 1.6–4.8 microns. These particles were in the form of stocky needles, and by X-ray diffraction, exhibited only the pattern characteristic of the tetragonal structure of chromium dioxide. The particles exhibited the following magnetic properties:

| | | |
|---|---|---|
| $H_{ci}$ | | 28 |
| $\sigma_s$ | gauss cm.$^3$/g | 89.8 |
| $\sigma_r$ | gauss cm.$^3$/g | 12.2 |
| $\sigma_r/\sigma_s$ | | 0.136 |
| Curie point | ° C | 120 |

EXAMPLES 2–5

These examples illustrate the use of other alkali metal chromium oxides and other conditions of pressure and temperature in the synthesis of ferromagnetic chromium oxide. The quantities of reactants, the conditions used, and the characteristics of the CrO$_2$ produced are summarized in Table I below.

EXAMPLE 6

NaCr$_3$O$_8$ (8 g.) and water (2 cc.) were cold-pressured to 850 atmospheres in a sealed platinum tube and then heated to 400° C. and 1000 atmospheres as rapidly as possible. The conditions of 400° C. and 1000 atmospheres were maintained for 12 hours whereupon the mixture was cooled to room temperature and the pressure released. The chromium dioxide produced had the following magnetic properties:

mospheres or higher. The reaction involved is believed to be represented by the following equation:

$$2CrO_3 + Cr_2O_3 + M_2Cr_2O_7 \rightarrow 2MCr_3O_8 \qquad (2)$$

When the reaction is conducted at atmospheric pressure or below, use of anhydrous reactants is not essential since any water initially present escapes during early stages of the heating cycle. Under superatmospheric pressure, however, the water content of the reaction mixture is important and in no case should the proportion of water present exceed an amount equivalent to two moles per mole of dichromate.

Anhydrous and dihydrated alkali metal dichromates or mixtures thereof can be used at 270–350° C. (and pressures of 1–1000 atmospheres), but at higher temperatures, for example, 400° C. (1000 atmospheres), substantially anhydrous dichromate is required for production of high quality MCr$_3$O$_8$. For economic reasons it is preferred to prepare MCr$_3$O$_8$ at atmospheric pressure. The CrO$_3$, Cr$_2$O$_3$, and the dichromate are preferably intimately mixed before reaction, and may be brought to reaction temperature rapidly. A several-fold excess of dichromate over that required by Equation 2 is normally employed since the presence of water-soluble dichromate facilitates washing the black, water-insoluble MCr$_3$O$_8$ from the reactor.

In preparing MCr$_3$O$_8$ by this novel process, a reactive form of Cr$_2$O$_3$ is used. This may be prepared by precipitation from aqueous chromium (III) nitrate or chromium (III) chloride solution using ammonium hydroxide. The precipitated hydrous chromium (III) oxide is thoroughly washed with water to remove nitrate or chloride anions and is then heated or calcined at substantially atmospheric pressure, i.e., at a pressure in the range of 0.5–5 atmospheres and a temperature of 200–1000° C. This heating is preferably carried out under oxidizing conditions, i.e., in the presence of air or oxygen, to yield a product which may in certain cases contain chromium with an average

TABLE I.—PREPARATION OF FERROMAGNETIC CHROMIUM DIOXIDE

| Example No. | Reaction mixture (g.) | | Cycle | Magnetic properties [1] | | | | Particle size (length, width in microns) |
|---|---|---|---|---|---|---|---|---|
| | MCr$^3$O$^8$ | Water | | Hci | $\sigma_s$ | $\sigma_r$ | $\sigma_r/\sigma_s$ | |
| 2 | KCr$_3$O$_8$ (3.9). | 0.65 | B | 56 | 89.2 | 18.2 | 0.20 | [2] 30, 2.5 |
| 3 | KCr$_3$O$_8$ (3.9). | 0.40 | B | 56 | 89.8 | 17.6 | 0.20 | [2] 25, 2.5 |
| 4 | KCr$_3$O$_8$ (8). | 2.00 | I | 28 | 91.2 | 13.0 | 0.14 | 9.6–61, 1.6–8 |
| 5 | NaCr$_3$O$_8$ (8). | 2.00 | B | 42 | 88.2 | 18.6 | 0.21 | 3.2–24, 0.8–2.4 |

[1] Of water-extracted product.
[2] Maxima.
B—Cold pressure to 850 atmospheres and heat at 2° C./min. to 265° C., hold at 265° C. and developed pressure for 4 hours, then heat at 2° C./min. to 400° C., maintain 400° C. and 1,000 atmospheres pressure for 6 hours.
I—Cold pressure to 850 atmospheres and heat at 2° C./min. to 265° C., hold at 265° C. and developed pressure for 10 hours, then heat at 2° C./min. to 400°C., hold at 400°C. and 1,000 atmospheres for 6 hours.

| | | |
|---|---|---|
| $H_{ci}$ | oersteds | 53 |
| $\sigma_s$ | gauss cm.$^3$/g | 92.4 |
| $\sigma_r$ | gauss cm.$^3$/g | 22.6 |
| $\sigma_r/\sigma_s$ | | 0.24 |

The alkali metal chromium oxide, MCr$_3$O$_8$, used in preparing CrO$_2$ by the process of this invention can be made as described by Wilhelmi, Acta, Chem. Scand. 12, 1965 (1958), and by Suchow et al., J. Am. Chem. Soc. 74, 1678 (1952), by reaction of CrO$_3$ with alkali metal dichromates at atmospheric or elevated pressure, viz., $$8CrO_3 + 2M_2Cr_2O_7 \rightarrow 4MCr_3O_8 + 3O_2 \qquad (1)$$

Alternatively, it has been discovered that MCr$_3$O$_8$ can be obtained in unusually finely divided physical form, particularly suitable for conversion to high coercivity CrO$_2$, by heating a mixture of CrO$_3$, Cr$_2$O$_3$, and an alkali metal dichromate for 0.25–12 hours at 170–400° C. and a pressure ranging from atmospheric or below to 1000 atmospheres or below to 1000 atvalence above 3 but less than 4. Periods of time ranging from a few minutes, e.g., 10 minutes, to several hours, e.g., 24 hours, are usually sufficient for the heating step.

Depending upon the reaction conditions selected, the preparation of MCr$_3$O$_8$ may be effected in open vessels or in closed pressure vessels. The preparation is preferably carried out in an atmosphere of air or oxygen though other chemically inert gases may be used. Reaction in flowing oxygen is advantageous.

EXAMPLES A–L

These examples illustrate the preparation of alkali metal chromium oxides, MCr$_3$O$_8$. The reactants employed, the reaction conditions, and the characteristics of the products are described in Table II. Examples J, K and L show the importance of controlling the amount of water used in this process: if 0.5 g. of H$_2$O is added to the reactant mixture of Example C (Example J), or 0.6 g. to the mixture of Example D (Example K), the product is CrO$_2$. Similarly, use of $Na_2Cr_2O_7 \cdot 2H_2O$ in place of $K_2Cr_2O_7$ of Example D (Example L)) results in formation of $CrO_2$.

cesium, with at least 10% by weight, based on the weight of $MCr_3O_8$, of water.

TABLE II.—PREPARATION OF $MCr_3O_8$

| Example No. | Reactants (g.) | | | Reaction conditions | | | Product | Maximum particle size (microns) (length, width) |
|---|---|---|---|---|---|---|---|---|
| | $CrO_3$ | $Cr_2O_3$ | $M_2Cr_2O_7$ | Temp., °C. | Pressure, atm. | Time, in hrs. | | |
| A | 4 | 2 | $Na_2Cr_2O_7 \cdot 2H_2O$, 15 | 225 | 135–233 | 12 | $NaCr_3O_8$ | (2) |
| B | 2 | 1 | $Na_2Cr_2O_7$, 5 | 350 | 500 | 6 | $NaCr_3O_8$ | (3) |
| C | 2 | 1 | $Na_2Cr_2O_7 \cdot 2H_2O$, 5 | 350 | 1,000 | 6 | $NaCr_3O_8$ | 7, 4 |
| D | 2 | 1 | $K_2Cr_2O_7$, 5 | 400 | 1,000 | 6 | $KCr_3O_8$ | 10, 3 |
| E | 2 | 1 | $Na_2Cr_2O_7$, 5 | 350 | 500 | 6 | $NaCr_3O_8$ | 11, 5 |
| F | 4 | 2 | $Na_2Cr_2O_7 \cdot 2H_2O$, 10 | 333 | 1 | 6 | $NaCr_3O_8$ | |
| G | 4 | 2 | $Na_2Cr_2O_7 \cdot 2H_2O$, 10 | 400 | 1 | 6 | $NaCr_3O_8$ | |
| H [1] | 4 | 2 | $Na_2Cr_2O_7 \cdot 2H_2O$, 10 | 200 | 1 | 5.5 | $NaCr_3O_8$ | |
| I [1] | 4 | 2 | $Na_2Cr_2O_7 \cdot 2H_2O$, 10 | 173–263 | 1 | 0.25 | $NaCr_3O_8$ | |
| J | 2 | 1 | $Na_2Cr_2O_7 \cdot 2H_2O$, 5; +0.5 g. $H_2O$. | 350 | 1,000 | 6 | $CrO_2$ | 8, 0.2 |
| K | 2 | 1 | $K_2Cr_2O_7$ + 0.6 g. $H_2O$, 5 | 400 | 1,000 | 6 | $CrO_2$ | 6, 0.25 |
| L | 2 | 1 | $Na_2Cr_2O_7 \cdot 2H_2O$, 5 | 400 | 1,000 | 6 | $CrO_2$ | 25, 0.5 |

[1] These preparations were carried out in an atmosphere of flowing oxygen saturated with water at 92° C.
[2] Not resolved under 60-fold magnification.
[3] Non-acicular, angular particles.

The chromium dioxide produced by the process of this invention is useful as the magnetic component of magnetic recording members, such as the magnetic records used in television recording and in information storage. In preparing such records the chromium dioxide is dispersed in an organic polymeric binder and may be magnetically oriented while the binder remains sufficiently fluid to allow motion of the magnetic particles. The products of this invention can also be employed in magnetic inks, as developers in ferromagnetography, and can be compressed to form permanent magnets.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing ferromagnetic chromium dioxide which comprises heating, at a temperature in the range 325–500° C. and under a pressure of at least 250 atmospheres,
at least one alkali metal chromium oxide of the formula $MCr_3O_8$ where M is selected from the group consisting of lithium, sodium, potassium, rubidium and cesium, with at least 10% by weight, based on the weight of $MCr_3O_8$, of water.

2. The process of claim 1 in which the temperature is in the range 350–450° C. and the pressure is in the range 500–1000 atmospheres.

3. The process of claim 1 in which there is also present in the reaction mixture a modifier for chromium dioxide selected from the group consisting of iron, antimony, ruthenium, tellurium, and compounds thereof.

4. The process of claim 1 in which the alkali metal chromium oxide is $KCr_3O_8$.

5. The process of claim 1 in which the alkali metal chromium oxide is $NaCr_3O_8$.

References Cited

UNITED STATES PATENTS 3,117,093 1/1964 Arthur et al. ———— 252—62.56
3,243,260 3/1966 Kubota et al. ———— 252—62.51

TOBIAS E. LEVOW, *Primary Examiner.*

J. COOPER, *Assistant Examiner.*

U.S. Cl. X.R.

23—56, 145; 252—62.56